Dec. 28, 1926.  
H. L. HIRSCHLER  
1,612,190  
VEHICLE BRAKE APPARATUS  
Filed Feb. 21, 1921  2 Sheets-Sheet 1
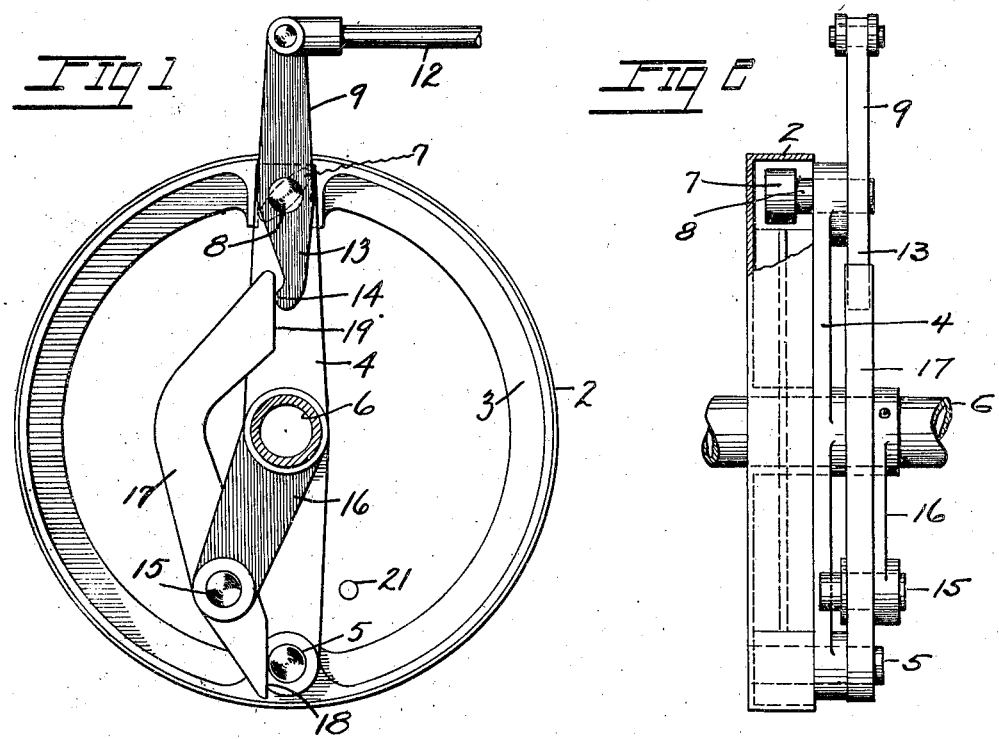
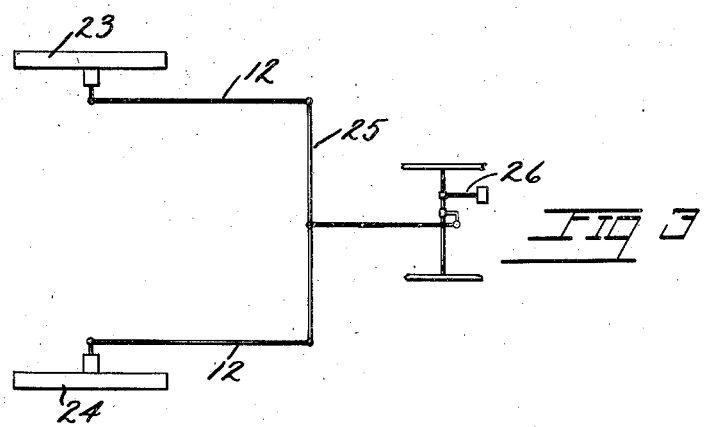
WITNESS  
INVENTOR  
HORACE L. HIRSCHLER  
BY  
his ATTORNEYS

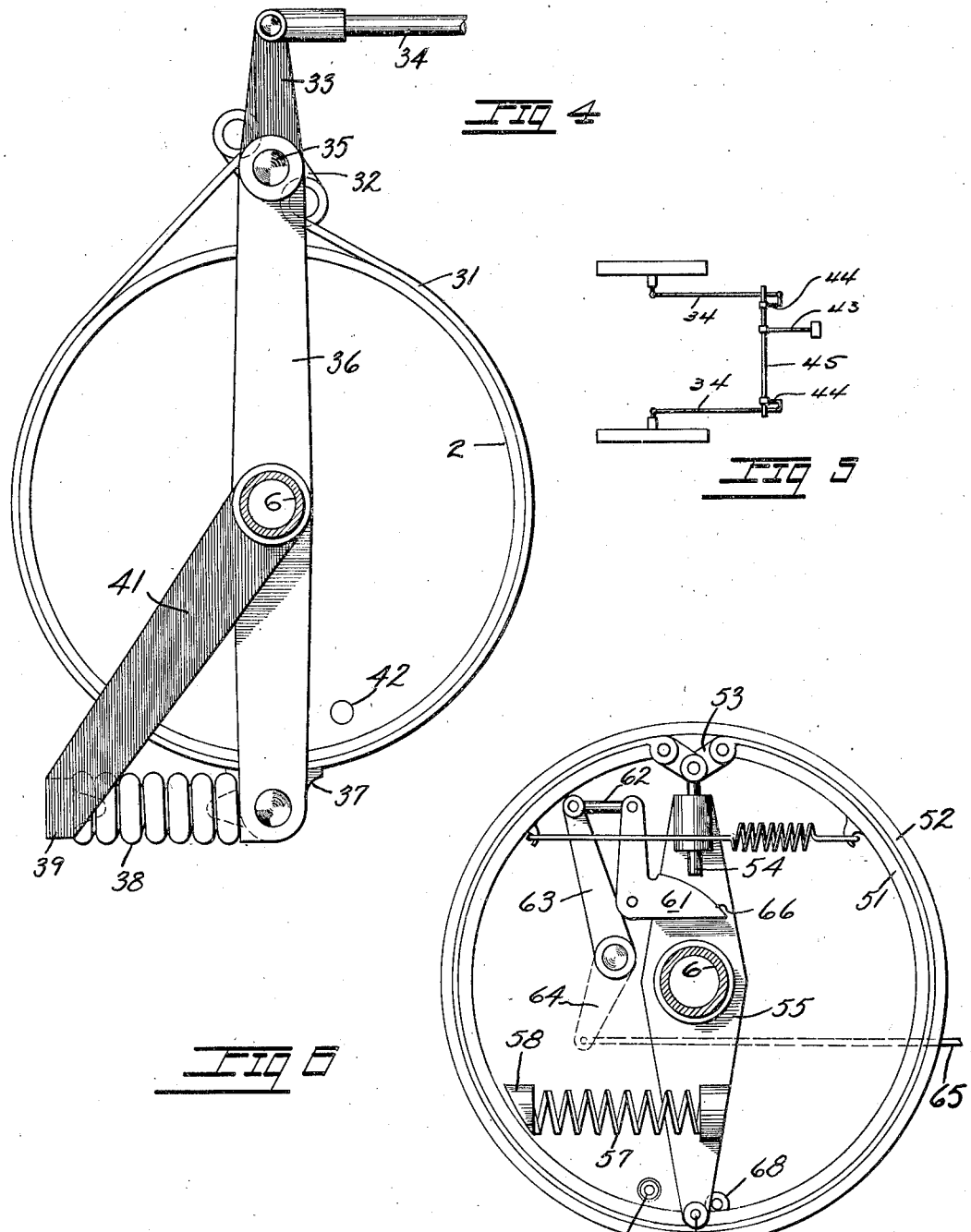

Patented Dec. 28, 1926.

1,612,190

UNITED STATES PATENT OFFICE.

HORACE L. HIRSCHLER, OF SAN FRANCISCO, CALIFORNIA.

VEHICLE BRAKE APPARATUS.

Application filed February 21, 1921. Serial No. 446,555.

The invention relates to vehicle brakes and particular to the brakes on road vehicles, such as automobiles and trucks wherein a brake drum is frictionally engaged over the greater portion of its area by a brake shoe or by brake shoes.

An object of the invention is to provide a brake apparatus which will produce equal braking effect on all of the brake equipped wheels of the vehicle, irrespective of the difference in the coefficients of friction of the brake surfaces. In automobiles, in which brakes are usually applied to the two rear wheels, it is desirable that the braking effects on the two wheels be equal, to insure the maximum braking effect, to prevent skidding and to cause equal wear on both rear tires. It frequently happens, however, due to the presence of oil, rust, grit or other material, that the coefficient of friction between the braking surface of one wheel is different from the coefficient of friction of the braking surfaces of the other wheel, so that when the brakes are applied, the braking effect on one wheel is much greater than the braking effect on the other wheel. It is an object of this invention to overcome this deleterious condition by providing a brake apparatus, which for equal movement of the two brake rods, or for equal pull on the brake rods, will produce the same retarding friction on both brakes, irrespective of the coefficients of friction of the braking surfaces.

The invention possesses other advantageous features, some of which, with the foregoing, will be set forth at length in the following description where I shall outline in full, those forms of the invention which I have selected for illustration in the drawings accompanying and forming part of the present specification. In said drawings, I have shown two forms of brake apparatus embodying my invention, but it is to be understood that I do not limit myself to such forms, since the invention, as set forth in the claims, may be embodied in a plurality of other forms.

Referring to said drawings:

Figure 1 is an elevation of one form of brake apparatus of my invention.

Fig. 2 is a side elevation of the apparatus shown in Fig. 1 with the brake drum removed.

Fig. 3 is a diagrammatic representation of the braking system particularly adapted to the brake apparatus shown in Fig. 1.

Fig. 4 is an elevation of an external contracting brake embodying my invention.

Fig. 5 is a diagrammatic representation of the braking system particularly adapted to the brake apparatus shown in Fig. 4.

Fig. 6 is an elevation of a modified form of brake apparatus embodying my invention.

The brake apparatus shown in Fig. 1 is particularly adapted to a braking system in which movement of the brake lever produces an equal pull in pounds on the brake rods, and the apparatus shown in Fig. 4 is particularly adapted to a braking system in which movement of the brake lever produces equal movement of the brake rods. One type of brake now largely used on motor vehicles comprises a brake drum 2 which is secured to the wheel of the vehicle and brake shoes 3 arranged within the drum and adapted to frictionally engage the surface of the drum. The shoes are usually pivoted at one end to a support fixed to the axle housing and are spread at the other end by a cam. In accordance with my invention, the shoes are pivoted at one end to the bar 4 by the pin 5. The bar 4 is usually disposed diametrically of the drum and is journaled on the axle housing 6. The shoe controlling cam 7 is secured to or formed integral with a pin 8 bearing in the opposite end of the bar 4 and is actuated by the lever 9 to which the pin 8 is secured. The lever 9 is pivotally attached to the brake rod 12. When the rod is pulled, the cam is turned to press the shoes against the drum and in the drawings the cam is shown partly turned, to apply the brake. The lever 9 is provided with an arm 13 extending past its fulcrum, which arm is provided on the end with a head 14.

Means are provided for opposing to the pull of the brake rod 12, a pull, the magnitude of which varies with the torque of the drum on the brake shoes, so that as the torque tends to become too great, the counter pull operates to reduce the frictional contact of the drum and the shoes, thus reducing the torque. Pivoted to a fixed fulcrum, in the present instance a pin 15 in the arm 16 secured to the axle housing 6, is a compensating lever 17, which is bent so that it may move without interference by the axle housing. The lever 17 is provided at one end with a bearing surface 18 engaging the pin 5 and at its other end with a bearing surface 19 engaging the head 14. As the friction between the drum and the shoes increases, due to the angular position of the cam 7, the bar 4 tends to rotate in the direction in which the drum is rotating. This movement of the bar causes the lever 17 to rock on its pivot 15, pushing against the head 14 and moving the lever 9 toward neutral position, thus reducing the friction between the drum and the shoes, until an equalized condition is produced. For a given pull in pounds, on the brake rod 12, a given braking effect is produced, irrespective of the coefficient of friction between the drum and the shoes. If the brake linings, which are interposed between the shoes and the drum, are oil soaked, the coefficient of friction will be small, requiring a large outward pressure of the shoes against the drum to produce the desired braking effect and if the lining is gritty or dry, the coefficient of friction will be great, requiring a lesser outward pressure of the shoes to produce the same braking effect. The apparatus of my invention is controlled by the torque of the drum on the brake shoes, to maintain such torque at the desired magnitude and accomplishes that result regardless of the condition of the brake lining. Movement of the bar in the direction of rotation of the drum, when the vehicle is moving forward, is limited by the pin 15 which extends into the plane of the bar 4 and movement of the bar, when the vehicle is moving backward is limited by the fixed stop 21, secured to the drum enclosing flange on the axle housing.

The brake rods 12 for the two brakes 23 and 24 of the vehicle are connected to an equalizing bar 25, which is connected, intermediate the rods, to the brake lever 26, which is preferably a pedal lever, operated by the foot of the driver. When the brake lever is depressed, an equal pull in pounds is exerted on both brake rods, due to the action of the equalizing bar, and this operates to move the brake shoes, so that an equal torque is produced between each rotating drum and its cooperating brake shoes.

In Fig. 4, I have shown an external contracting band or shoe 31 adapted to be contracted into frictional engagement with the drum 2, the drawing showing the band partly contracted. The ends of the band are attached to the arm 32, formed integral with the lever 33 to which the brake rod 34 is connected. The lever is pivoted intermediate the points of connection of the band, to a pin 35, seated in the upper end of the bar 36 which is journaled on the axle housing 6 and which at its opposite end is pivoted to the bracket 37 secured to the brake band. Angular movement of the bar 36 in the direction of rotation of the drum, caused by the torque exerted on the band by the rotating drum, is controlled and limited by a compression spring 38 interposed between a fixed abutment 39 and the bracket 37. The abutment 39 is preferably formed on the end of the arm 41 secured to the axle housing. Motion of the bar in the opposite direction, due to application of the brake when the vehicle is moving backward, is limited by the fixed stop 42, secured to the drum closing flange on the axle housing.

In this construction, a given movement of the brake rod will produce a given torque on the band and, consequently, a given braking effect, regardless of the coefficient of friction between the band and the drum. For a given movement, the band is contracted a predetermined amount causing a torque which compresses the spring and moves the pivot 35 forward, to lessen the amount of contraction of the band. The spring therefore operates to cause a given movement of the lever 33 to produce a given total torque on the band, regardless of the coefficient of friction.

Since this construction operates with a given movement of the brake rod to produce a given braking effect, the braking system is designed so that movement of the brake lever 43 will cause equal movement of the rods 34 and in this construction the qualizing bar is eliminated and the rods 34 connected directly to arms 44 on the cross shaft 45, to which the brake lever 43 is secured.

In the construction shown in Fig. 6, the brake shoes 51 are expanded against the drum 52 by a toggle 53, the actuating rod 54 of which is slidable in the end of the bar 55, journaled on the axle housing 6 and provided at its lower end with a pin 56 on which the brake shoes are pivoted. The angular position of the bar is controlled by a compression spring 57 interposed between the bar and a fixed support 58. The rod 54 is moved to apply the brakes by a cam faced lever 61 fulcrumed on a fixed pivot and connected by the link 62 and levers 63 and 64 with the brake rod 65. The cam face 66 of the lever 61 is eccentric to the axis of the drum, so that as the bar is moved due to the torque of the drum on the band, the rod 54 moves over the retreating face of the cam 66, lessening the pressure of the shoes against the drum. The movement of the bar is stopped in one direction by the fixed stop 67 and in the other direction by the fixed stop 68. The various fixed stops are secured to the usual flange on the axle housing which closes the inner side of the drum.

I claim:

1. A brake apparatus, comprising a rotatable brake drum, a brake shoe adapted to be moved into contact with said drum, a bar connected to said shoe and rotatable through a limited distance about the axis of said drum, and means carried by said bar for varying the pressure of the shoe on the drum.

2. A brake apparatus, comprising a rotatable brake drum, a brake shoe adapted to be moved into contact with said drum, a bar movable with said drum and connected to said shoe, means for controlling the rotational movement of said bar and means carried by said bar for varying the pressure of the shoe on the drum.

3. A brake apparatus, comprising a rotatable brake drum, a brake shoe adapted to be moved into contact with said drum, a rotatable bar on which said shoe is mounted, a device carried by said bar for increasing the pressure of the brake shoe on the drum, producing a torque on said shoe and producing rotational movement of said bar, movement of said bar serving to decrease the pressure of the shoe on the drum and means for controlling the movement of the bar.

4. In a vehicle provided with a plurality of wheels, brake drums secured to two of said wheels, brake shoes adapted to engage said drums and be rotated a limited distance thereby, means for moving said shoes into engagement with said drums and means actuated by the rotational movement of the shoes for moving said shoe moving means to produce substantially equal braking effect on the two drums.

5. In a wheeled vehicle, braking surfaces attached to and rotating with two wheels of the vehicle, a brake element associated with each braking surface, means operative to move said brake elements into contact with said braking surfaces, said elements being adapted to be moved by the braking surfaces, and means actuated by the movement of the brake elements for moving said brake element moving means to maintain the torque on the two brake elements substantially equal.

6. In a vehicle provided with a plurality of wheels, brake drums secured to two of said wheels, brake shoes adapted to engage said drums and be rotated a limited distance thereby, brake rods for moving the shoes into engagement with the drums, an equalizing bar to which said rods are connected and which is connected to an actuating means and means actuated by the rotational movement of the shoes for moving said bar to produce substantially equal braking effect on the two drums, independent of the relative coefficients of friction between the respective drums and shoes.

7. A vehicle braking system comprising at least two braking devices, a common actuating means for applying force to said devices, means for effecting a predetermined distribution of actuating force to said devices, said last named means constituting the only mechanism interconnecting said devices, and means for maintaining a constant ratio between the respective braking torques developed by said devices when actuated.

In testimony whereof, I have hereunto set my hand.

HORACE L. HIRSCHLER.